A. J. MORSE.
SPRING TIRE.
APPLICATION FILED JULY 1, 1914.

1,158,070.

Patented Oct. 26, 1915.

Witnesses:
M. J. Whittaker
A. H. Smith

Inventor:
Arthur Joseph Morse
per R. W. Waghorn
Attorney.

UNITED STATES PATENT OFFICE.

ARTHUR JOSEPH MORSE, OF NEWPORT, MELBOURNE, VICTORIA, AUSTRALIA.

SPRING-TIRE.

1,158,070.  Specification of Letters Patent.  Patented Oct. 26, 1915.

Application filed July 1, 1914. Serial No. 848,332.

*To all whom it may concern:*

Be it known that I, ARTHUR JOSEPH MORSE, a subject of the King of Great Britain and Ireland, and a resident of the post-town of Newport, in the municipality of Williamstown, a suburb of the city of Melbourne, in the county of Bourke, State of Victoria, Commonwealth of Australia, whose post-office address is 107 Mason street, in the said post-town of Newport, have invented certain new and useful Improvements in Spring-Tires, of which the following is a specification.

This invention relates to resilient tires for vehicle wheels of the kind wherein a series of helical springs are disposed around the wheel rim.

Hitherto a variety of arrangements of this character have been proposed, many of which have been defective, have created noise, and have been exposed to the detrimental influence of the weather.

The object of this invention is to provide a cheap, simple and effective combination which will be equally applicable to existing as to new wheels, and in which the springs around the periphery of the wheel are protected and so inclosed that the appearance of the tire corresponds to that of the ordinary pneumatic type.

Figure 1:
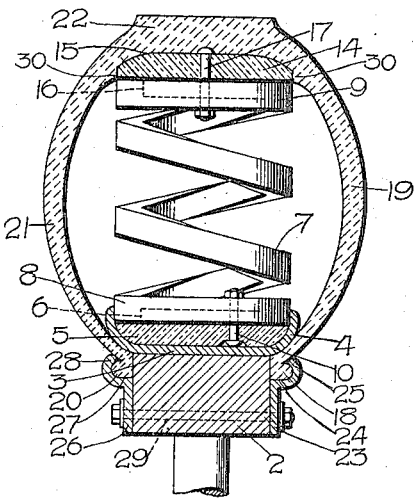
Figure 2:
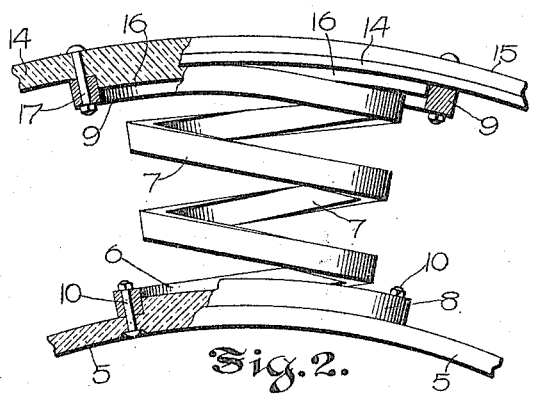
Figure 3:
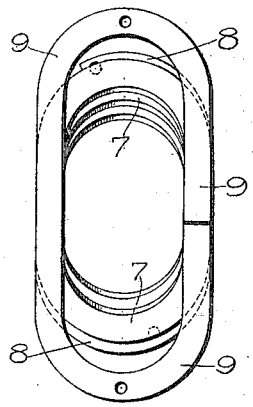
Figure 4:
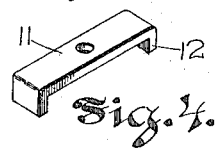
Figure 5:
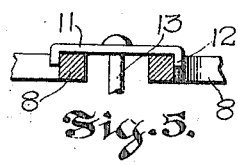
Figure 6:
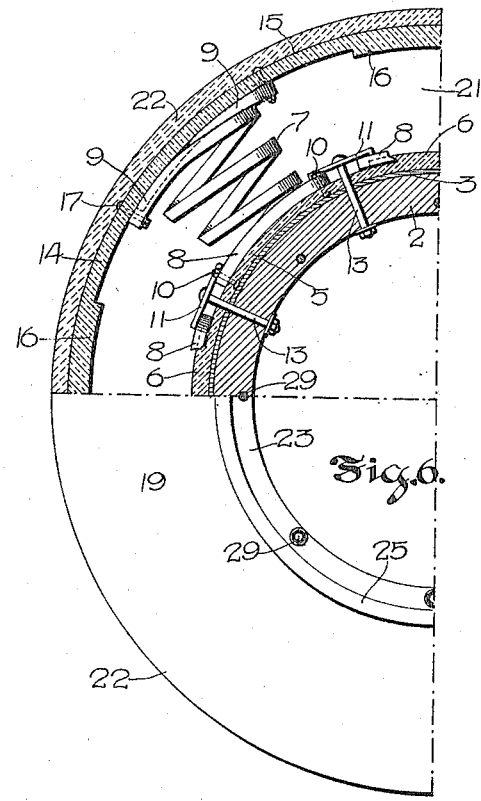

Referring to the drawings which form a part of this specification:—Figure 1 is a cross section of a spring tire according to the invention. Fig. 2 is a detail elevation partly in section and showing a spring in position between an inner and an outer flexible ring. Fig. 3 is a plan of a spring employed as seen in Figs. 1 and 2. Fig. 4 is a perspective view of a retention plate. Fig. 5 is a sectional detail view showing a retension plate holding the enlarged inner convolutions of two springs. Fig. 6 is a side view of half of a wheel according to the invention, the lower half of the view being in side elevation and the upper half being in section. Portions have been removed or omitted for convenience of illustration.

The invention includes a rim 2 through which are formed a series of retention bolt holes. Around the periphery of the rim and secured thereto is a circumferential ring 3 having side flanges 4. Through the ring 3 are bolt holes corresponding with the bolt holes in the rim. A ring such as 3 is usually attached to common automobile wheels. In the present instance, however, the ordinary side flanges are elevated instead of being inturned.

Around the ring 3 and between the side flanges 4 thereof is an inner flexible ring 5 of any suitable material. It may be formed of leather. Projecting from the flexible ring 5 is a series of protuberances 6 whose peripheral walls are substantially radial with respect to the tire and formed through the said flexible ring 5 are bolt holes corresponding with the holes in the rim 2 and the circumferential ring 3. Bearing against the inner flexible ring 5, and snugly encircling the protuberances 6, are the inner convolutions of a series of helical springs 7. The innermost convolution of each spring 7 is enlarged or extended as at 8. The outermost convolution of each spring is also enlarged or extended as at 9. The intermediate convolutions between the enlarged inner and outer convolutions are, in side elevation, tapered or of larger diameter toward the outermost than toward the innermost convolution. This is shown in Figs. 2 and 6. In end elevation, however, the whole spring is of the same width, as seen in Fig. 1. By forming the springs with a larger outer than inner convolution the difference between the diameters of the inner flexible ring 5 and an outer flexible ring, hereinafter described, is provided for. Formed through each enlarged inner convolution 8 at each inner side thereof is a bolt hole. Passing through the bolt holes and retaining the spring to the inner flexible ring 5 are holding bolts 10.

Extending between the enlarged inner convolutions 8 of adjacent helical springs 7 are retention plates 11 each having at each of its ends a downturned lip 12. Passing through the retention plates between the springs, through the bolt holes in the inner flexible ring 5, through the bolt holes in the circumferential ring 3 and through the corresponding bolt holes in the rim 2 are retention bolts 13. The springs 7 and inner flexible ring 5 are thereby securely retained to each other and to the rim 2.

Encircling the enlarged outer convolutions 9 of the helical springs 7 is an outer flexible ring 14 having a convex tread surface 15. Projecting inwardly from the ring 14 is a series of protuberances 16 snugly encircled by the springs 7. The peripheral walls of these protuberances are substantially radial with respect to the tire. Formed through the outer flexible ring 14 is a series of bolt holes corresponding with the bolt holes formed in the enlarged outer convolutions 9. Passing through the bolt holes of the enlarged outer convolutions 9 and the bolt holes of the outer flexible ring 14 are holding bolts 17 whereby the springs are securely retained to the outer flexible ring.

With the foregoing is used a cover consisting of a right bead 18 from which extends a right wall 19 and left bead 20 from which extends a left wall 21. Between the walls extends a tread 22 which may be suitably reinforced. Formed in the cover, in the tread portion thereof, are two circumferential steps or shoulders 30 to securely retain the cover in proper lateral position in relation to the flexible ring 14. Retaining the cover to the rim 2 is a right ring comprising a flange 23 integral with which is a shoulder 24 having an overhanging lip 25 forming an internal bead space. Into the bead space right bead 18 of the cover passes. A left ring is also employed to retain the cover. It comprises a flange 26 integral with which is a shoulder 27 having an overhanging lip 28 forming an internal bead space. Into the said bead space the left bead 20 passes. Extending between the flanges 23 and 26 and passing through the rim 2 of the wheel is a series of holding bolts 29.

With this invention a series of compression springs is provided around the periphery of a wheel to absorb road shocks and inequalities, which springs, however, are comparatively noiseless owing to the cover inclosing the same. Further the springs are protected from the weather, dust and the like. To assemble the parts the inner flexible ring 5 carrying the springs 7 is sprung over the circumferential ring 3. Or the said inner flexible ring may be divided and its ends be laced or otherwise secured together after said ring is placed in position around the circumferential ring 3. The inner flexible ring 5 and the springs retained thereto are now securely held together and to the rim 2 by means of the retention plates 11 and bolts 13. The right retention ring by its flange 23 and holding bolts 29 is placed in position upon the rim 2, the right bead 18 of the cover being accommodated in the internal bead space of the said right ring and bearing against the corresponding flange 4 of the circumferential ring 3. A suitable clamping device may be employed to compress all of the springs if necessary. The left wall 21 of the cover is now passed over the outer flexible ring 14, the left bead 20 being then passed beneath the corresponding flange 4 of the circumferential ring 3 and into the internal bead space of the left ring. The flanges 23 and 26 of the right and left wings are now drawn together and held to the rim 2 by means of the holding bolts 29 hereinbefore described and no circumferential movement or "creep" can occur between the various parts.

Having now described my invention what I claim as new and desire to secure by Letters Patent is:—

1. In a tire, the combination of inner and outer substantially concentric rings, protuberances arranged on the opposing faces of said rings, the said protuberances being arranged in pairs and elongated circumferentially of the tire, the end walls of each pair of said protuberances being arranged in a line substantially radially of the wheel and tire, and helical springs interposed between said rings and having their terminal convolutions of greater diameters than the intermediate convolutions and snugly embracing the walls of the opposing protuberances.

2. In a tire, the combination of inner and outer substantially concentric flexible rings, protuberances formed integrally within said rings upon the opposing faces thereof, the said protuberances being arranged in pairs and elongated circumferentially of the tire, the end walls of each pair of said protuberances being arranged in a line substantially radially of the wheel and tire, and helical springs interposed between said rings and having their terminal convolutions of greater diameters than the intermediate convolutions and snugly embracing the walls of the opposing protuberances.

3. In a tire, the combination of inner and outer flexible and substantially concentric rings having radially alined protuberances upon their opposing faces and helical springs interposed between said rings and embracing said protuberances with their end convolutions; retention plates each provided at its opposite ends with angular disposed lips for engagement with the inner face of the said end convolutions, each plate extending from one spring to the adjacent end of the next radially disposed spring, and bolts passing through said plates and the said inner ring to secure the tire to the rim of the wheel.

In testimony whereof I have hereunto affixed my signature in the presence of two subscribing witnesses.

ARTHUR JOSEPH MORSE.

Witnesses:
CECIL McPLASTEUR,
GEORGE A. M'REN.